United States Patent [19]

Lawrence et al.

[11] Patent Number: 5,041,998

[45] Date of Patent: Aug. 20, 1991

[54] DIGITAL VIDEO MIXER

[75] Inventors: Frank Lawrence, Grass Valley; Raymond Blackham, Penn Valley, both of Calif.

[73] Assignee: The Grass Valley Group Inc., Nevada City, Calif.

[21] Appl. No.: 444,582

[22] Filed: Nov. 30, 1989

[51] Int. Cl.$^5$ .............................................. G06F 7/52
[52] U.S. Cl. ................................... 364/715.01; 364/736
[58] Field of Search ..................... 364/715.01, 736, 745

[56] References Cited

U.S. PATENT DOCUMENTS

| | | | |
|---|---|---|---|
| 3,842,250 | 10/1974 | Anderson | 364/745 |
| 4,612,627 | 9/1986 | Sugita et al. | 364/736 |
| 4,760,542 | 7/1988 | Mehrgardt et al. | 364/715.01 |
| 4,797,844 | 1/1989 | Jackson | 364/724.01 |
| 4,811,260 | 3/1989 | Abe et al. | 364/715.01 |

Primary Examiner—David H. Malzahn
Attorney, Agent, or Firm—Francis I. Gray; John Smith-Hill

[57] ABSTRACT

An improved digital mixer provides means for correcting a conventional mixer output that uses the full range of a mixer control variable to satisfy desired mixer constraints. The correction is accomplished by combining the mix output with a correction signal to satisfy the equation $$MIX = [A*K + B*/K] + [A*K + B*(/K)]/2 < n) + D.$$

15 Claims, 1 Drawing Sheet

DIGITAL VIDEO MIXER

BACKGROUND OF THE INVENTION

The present invention relates to the mixing of two signals, and more particularly to an improved digital video mixer that adds a correction term to provide full mixing range while satisfying all mixing constraints.

A mix between two signals, A and B, with the mix proportion controlled by a variable K is mathematically defined as:

$$MIX = A*K + B*(1.0-K)$$

where K is a variable having a range between 0.0 and 1.0 inclusive. Furthermore the mix result should meet the following constraints:

1) $A*K + B*(1.0-K) = A$ where $K = 1.0$
2) $A*K + B*(1.0-K) = B$ where $K = 0.0$
3) $A*K + A*(1.0-K) = A$ for all K In one prior art method of mixing employing a digital mixer control signal to represent the variable K, for the K variable 0.0 is defined as 0 and 1.0 is defined as $2 > (n-1)$ where represents the exponentiation operator and n is the number of bits in the digital mixer control signal. Therefore when $K = 0$, $(1.0 - K) = 2 > (n-1)$ and when $K = 2 > (n-1)$, $(1.0 - K) = 0$. K values in the range $2 > (n-1) + 1$ to $2 > n-1$ are not valid. For eight-bit signals (n=8) 0.0 is 0.0000000 binary and 1.0 is 1.0000000 binary. K values in the range 1.0000001 to 1.1111111 binary are not valid. Thus approximately one-half of the available range of K is not valid. This implementation, as shown in FIG. 1, satisfies all of the constraints, but the loss of resolution due to the unused values of K results in coarser mix steps.

Another prior art method is shown in FIG. 2 where for the K input 0.0 is defined as 0 and 1.0 is defined as $2 > n-1$. When 1.0 is defined as $2 > n-1$, $(1.0-K)$ is equivalent to K. Therefore when $K = 0$, $(1.0-K) = 2 > n-1$ and when $K = 2 > n-1$, $(1.0-K) = 0$. For eight-bit signals (n=8) 0.0 is .00000000 binary and 1.0 is .11111111 binary. This implementation uses all of the available K range, but the results do not satisfy all of the constraints. For example when A=11111111. binary, K=.11111111 binary and K=.00000000 binary, $A*K + B*K$ should equal A. The $B*K$ term equals zero, but the $A*K$ term equals 11111111. * .11111111 = 11111110.00000001 which, when truncated to eight bits, becomes 11111110. rather than 11111111.

Thus what is desired is an improved digital mixer for mixing two signals according to a variable K that uses the full range of K while meeting all desirable mixer constraints.

SUMMARY OF THE INVENTION

Accordingly the present invention provides an improved digital video mixer that adds a correction term to assure that the full variable K range is used and all desirable mixer constraints are met. Specifically the correction term corrects the mix result to satisfy the desirable constraints. The corrected mix is defined as:

$$MIX = [A*K + B* K] + [A*K + B*(K)]/(2>n) + D$$

The D term represents some form of rounding function according to the desired result.

The objects, advantages and other novel features of the present invention are apparent from the following detailed description when read in conjunction with the appended claims and attached drawing.

DESCRIPTION OF THE PREFERRED EMBODIMENT

Figure 1:
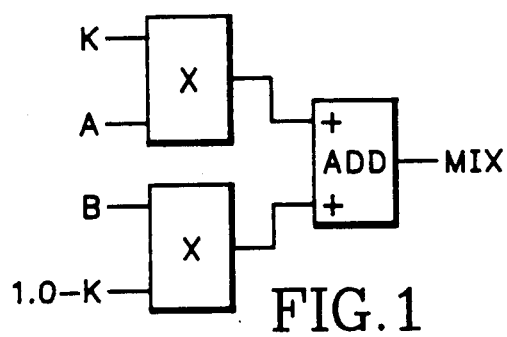
FIG. 1 is a block diagram of a first prior art mixer.
Figure 2:
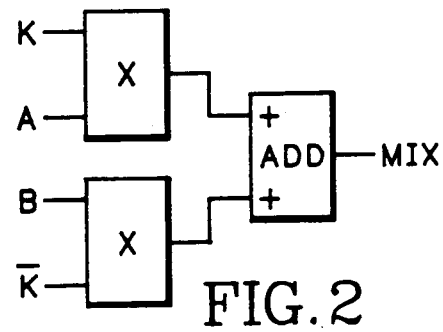
FIG. 2 is a block diagram of a second prior art mixer.
Figure 3:
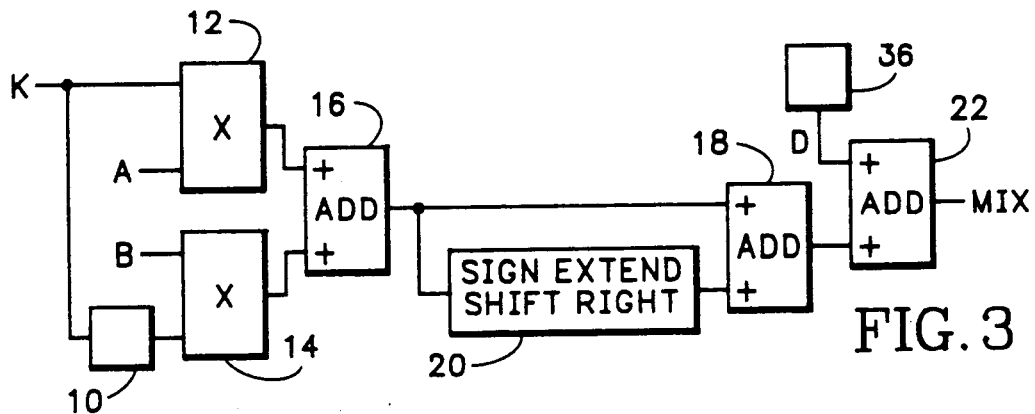
FIG. 3 is a block diagram of an improved digital mixer according to the present invention.

Referring now to FIG. 3 a conventional mixer, such as that shown in FIG. 2, has a first multiplier 12 to which a first signal A and a mixer control variable K are input. A complementer 10 provides the complement K of the mixer control variable K, and second multiplier 14 has a second signal B and the output of complementer 10 as inputs. The outputs of multipliers 12, 14 are summed by a first adder 16 to produce a first mix output according to the prior art. The first mix output, however, is input to a second adder 18 and to a sign extension right shifter 20. The output of the sign extension right shifter 20 is $(A*K + B*11 K)/2 < n$ where the parenthetical term is the first mix output input to the shifter and the divisor term represents right shifting by n bits so that for 011111111.00000000 binary (MSB is sign) sign extended right shift of eight places and truncated to seventeen bits (sign plus sixteen bits) becomes 000000000.11111111 binary. This output also is input to the second adder 18. The output of the second adder 18 is input to a third adder 22 together with a correction signal D provided by a correction signal generator 36. The output of the third adder 22 is a final mix output signal that uses the full range of K while satisfying all the desired mixer constraints and satisfies the equation:

$$MIX = [A*K + B* K] + [A*K + B* K]/(2<n) + D$$

The correction signal D provided by correction signal generator 36 is dependent upon the desired result. For dithered rounding to an N-bit result D is a random, or pseudorandom, number distributed from $$1/(2<n) \leq D \leq (2< n - 1/(2<n)).$$

For a truncated result $$D = 1/(2<n).$$

And for a result rounded up if the fractional portion is greater than or equal to one-half $$D = [2<(n-1)]/(2<n) + 1/(2<n).$$

The only requirement for D is that it produce the desired result.

Figure 4:
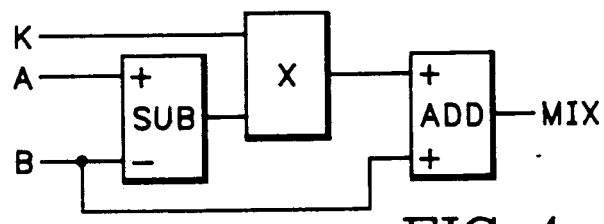
FIG. 4 is a block diagram of a prior art single multiplier mixer.

Another prior art mixer that uses a single multiplier is shown in FIG. 4 and implements the equation $$MIX = (A - B)*K + B.$$

Figure 5:
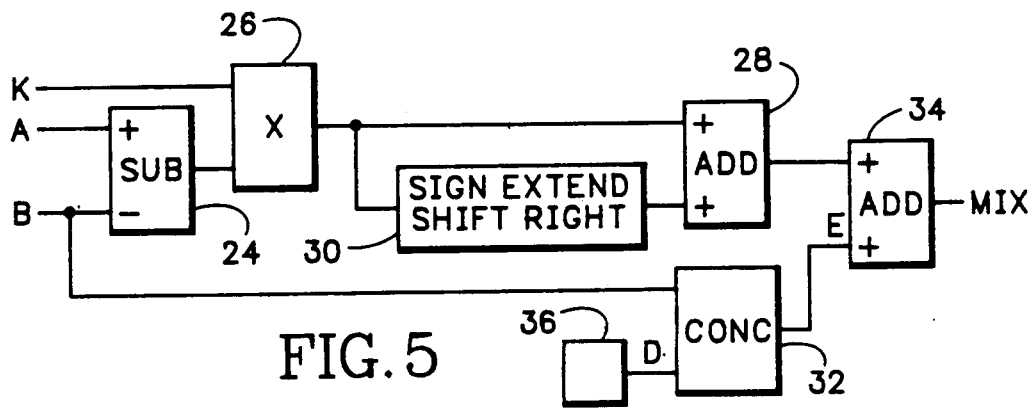
FIG. 5 is a block diagram of an improved single multiplier digital mixer according to the present invention.

This prior art single multiplier mixer may be modified to incorporate the present invention as indicated in FIG. 5. A subtracter 24 has as inputs the two signals A and B. The output of the subtracter 24 together with the mixer control variable K is input to a multiplier 26. The output of the multiplier 26 is input to a first adder 28 and to a sign extension right shifter 30, the output of which also is input to the first adder. The second signal B is concatenated with the correction signal D by concatenation circuit 32 to form signal E, where B occupies the integer portion and D occupies the fractional portion. Concatenation (a connected series) is a special case of addition where nonzero terms do not overlap so that AB:CD (concatenation) is equivalent to AB00+00C-D=ABCD. The output of the concatenation circuit 32, E, and the output of the first adder 28 are input to a second adder 34, the output of which is the desired mix output.

Thus the present invention provides an improved digital mixer that uses the full range of a mixer control variable while satisfying desired mixer constraints by adding a correction term to the mixer equation to correct to the desired constraints.

What is claimed is:

1. A digital mixer for mixing first and second signals under control of a mixer control variable, comprising:
   means for combining the first and second signals under control of the mixer control variable to produce a first mix output,
   means for generating a sign extended right shift variation of the first mix output, and
   means for combining the first mix output and the sign extended right shift variation of the first mix output to produce a modified first mix output, 2. A digital mixer according to claim 1, comprising means for generating a correction signal and means for combining the correction signal and the modified first mix output to produce a final mix output.

3. A digital mixer according to claim 2, wherein the means for combining the first mix output and the sign extended right shift variation of the first mix output comprise a first adder and the means for combining the modified first mix output and the correction signal comprise a second adder.

4. A digital mixer according to claim 1, wherein the means for combining the first and second signals under control of the mixer control variable comprise a first multiplier for combining the first signal with the mixer control variable to produce a first product signal, a second multiplier for combining the second signal with a value derived from the mixer control variable to produce a second product signal, and an adder for combining the first and second product signals to produce the first mix output.

5. A digital mixer according to claim 1, wherein the means for combining the first and second signals comprise a subtractor for subtracting the first signal from the second signal to produce a difference signal and a multiplier for combining the difference signal with the mixer control variable to produce the first mix output.

6. A digital mixer for mixing first and second signals under control of a mixer control variable, comprising:
   means for generating a function signal that represents a function of the first and second signals,
   means for operating on the function signal with the mixer control variable to produce a first mix output,
   means for generating a sign extended right shift variation of the first mix output, and
   means for combining the first mix output and the sign extended right shift variation of the first mix output to produce a modified first mix output.

7. A digital mixer according to claim 6, wherein the means for generating a function signal comprise a subtractor for subtracting the second signal from the first signal to provide the function signal.

8. A digital mixer according to claim 7, wherein the means for operating on the function signal comprise a multiplier for multiplying the function signal by the mixer control variable to produce the first mix output.

9. A digital mixer according to claim 6, comprising means for generating a correction signal, means for concatenating the correction signal with the second signal to provide a concatenation signal, and an adder for adding the first mix output and the concatenation signal to provide a final mix output.

10. A digital mixer for mixing first and second signals under control of a mixer control variable, comprising:
    a first multiplier for combining the first signal and the mixer control variable to produce a first product signal,
    a second multiplier for combining the second signal and a value derived from the mixer control variable to produce a second product signal,
    a first adder for combining the first and second product signals to produce a first mix output,
    means for generating a variation of the first mix output;
    a second adder for combining the first mix output and the variation of the first mix output,
    means for generating a correction signal, and
    a third adder for combining the output of the second adder with the correction signal to produce a final mix output.

11. A digital mixer according to claim 10, comprising a complementer for generating the complement of the mixer control variable, and wherein the second multiplier combines the second signal with the complement of the mixer control variable to produce the second product signal.

12. A digital mixer according to claim 10, wherein the means for generating the correction signal comprise means for generating a signal representing a random or pseudorandom number.

13. A digital mixer according to claim 10, wherein the means for generating the correction signal comprise means for generating a signal representing a constant.

14. A digital mixer for mixing first and second signals under control of a mixer control variable, comprising:
    a subtractor for subtracting the first signal from the second signal to produce a difference signal,
    a multiplier for combining the difference signal and the mixer control variable to produce a first mix output,
    means for generating a variation of the first mix output; and
    an adder for combining the first mix output and the variation of the first mix output to provide a sum signal.

15. A digital mixer according to claim 14, comprising means for generating a correction signal, means for concatenating the correction signal with the first signal to provide a concatenation signal, and a second adder for combining the sum signal with the concatenation signal to provide a final mix output.

* * * * *